(12) United States Patent
Goldbaum

(10) Patent No.: US 7,656,386 B1
(45) Date of Patent: Feb. 2, 2010

(54) LOW PROFILE POINTING DEVICE FOR PERSONAL COMPUTERS

(76) Inventor: Harold Goldbaum, 22 Pine Arbor La., Apt. 202, Vero Beach, FL (US) 32962

( * ) Notice: Subject to any disclaimer, the term of this patent is extended or adjusted under 35 U.S.C. 154(b) by 0 days.

(21) Appl. No.: 12/052,899

(22) Filed: Mar. 21, 2008

Related U.S. Application Data

(60) Provisional application No. 60/919,205, filed on Mar. 21, 2007.

(51) Int. Cl.
*G09G 5/08* (2006.01)
(52) U.S. Cl. ........................ 345/156; 345/157
(58) Field of Classification Search .......... 345/156–184
See application file for complete search history.

(56) References Cited

U.S. PATENT DOCUMENTS

| | | | | |
|---|---|---|---|---|
| 5,552,808 | A * | 9/1996 | Hsu ........................... | 345/157 |
| 6,107,990 | A * | 8/2000 | Fleming, III ................ | 345/157 |
| 6,163,326 | A * | 12/2000 | Klein et al. ................. | 345/156 |
| 6,166,722 | A * | 12/2000 | Kawabe et al. .............. | 345/169 |
| 6,351,372 | B1 * | 2/2002 | Kim ........................... | 345/168 |
| 6,369,798 | B1 * | 4/2002 | Yatsu et al. ................. | 345/167 |
| 6,822,635 | B2 * | 11/2004 | Shahoian et al. ........... | 345/156 |
| 6,970,156 | B1 | 11/2005 | Silverstein | |
| 2004/0012568 | A1 | 1/2004 | Velikov et al. | |
| 2006/0077177 | A1 | 4/2006 | Kirtley et al. | |
| 2006/0077180 | A1 | 4/2006 | Kirtley et al. | |
| 2006/0152484 | A1 | 7/2006 | Rolus | |
| 2006/0176277 | A1 | 8/2006 | Daniel et al. | |
| 2008/0055275 | A1 * | 3/2008 | Orsley ....................... | 345/175 |

* cited by examiner

*Primary Examiner*—Regina Liang
(74) *Attorney, Agent, or Firm*—Allen D. Hertz

(57) ABSTRACT

A low profile pointing device for personal computers includes a thin elongate case for insertion in a PC Card slot and defining a cavity therein. A frame forms one surface of the case and defines an opening therethrough. A slidable plate is disposed within the cavity and is translatably supported in a plane parallel to the frame. A portion of the slidable plate is accessible through said frame opening. At least one motion sensor is mounted within the case and is coupled with the slidable plate for sensing movement of the plate and converting the sensed movements into electrical data signals. A communication interface transmits data signals between the motion sensor and the computer.

25 Claims, 11 Drawing Sheets

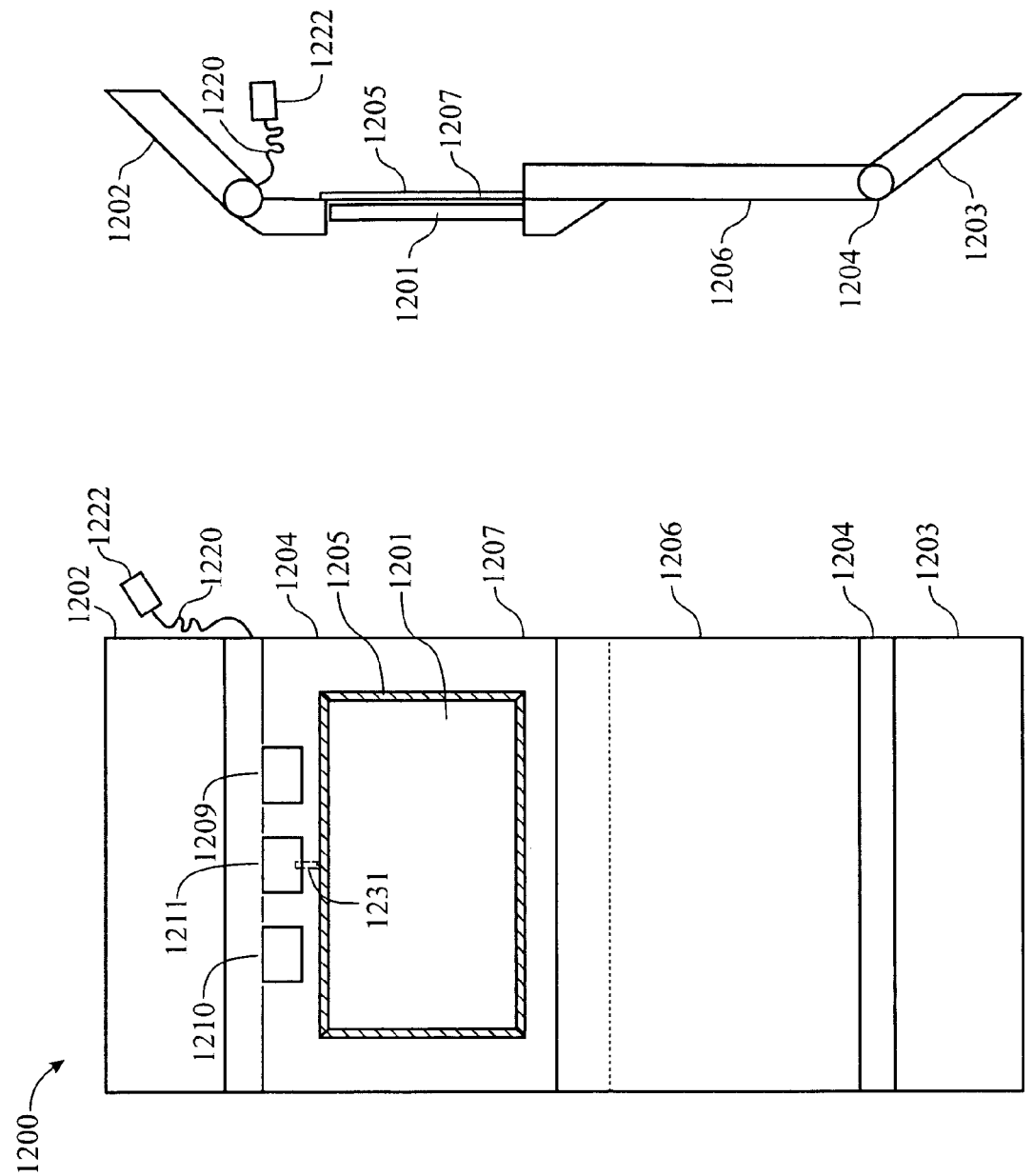

LOW PROFILE POINTING DEVICE FOR PERSONAL COMPUTERS

CROSS REFERENCE TO RELATED APPLICATIONS

This application claims the benefit of U.S. Provisional Patent Application Ser. No. 60/919,205, filed Mar. 21, 2007.

BACKGROUND OF THE INVENTION

1. Field of the Invention

The present invention relates to pointing devices for personal computers in general and more particularly to a low profile external pointing device.

2. Discussion of the Related Art

Personal computers have become an integral part to the business and personal activities of a large number of today's individuals. The personal computer has evolved from a desktop box with a CRT monitor largely limited in one fixed location to a state-of-the-art compact notebook with a flat panel display exhibiting processing power and display resolutions only dreamed of a few years ago. Today's notebook computers are small and continue to shrink even as their power continues to expand. These computers utilize operating systems that typically incorporate a graphical user interface (GUI). One of the primary aids for using a GUI is the incorporation of a pointing device to facilitate inputs into the computer. A pointing device permits the users to freely move a "pointer" or cursor around the display screen, to make selections and numerous other functions.

The most common pointing device is a mouse, which typically incorporates a captive ball that is rotated by translating the mouse across a flat surface. An electro-mechanical mechanism in the mouse translates the ball movement into electrical signals that are translated by the computer into movements of the onscreen pointer. The mouse will also incorporate one or more switches or buttons operated by the user's fingers to perform additional functions with respect to the onscreen display. Various configurations of pointing devices have been developed over the years in addition to the mouse such as trackballs, touchpads, joysticks, and touch screens to name a few. Each functions to move the onscreen pointer and has associated therewith one or more input function buttons. However, by far, the most common pointing device associated with a computer is a mouse.

The typical mouse is somewhat voluminous compared to the size of small notebook computers. Manufacturers of notebooks, seeking to retain the mouse's capacities while maintaining the small size of the computer, devised the touchpad, which is a thermal-sensor based device to move the computer's cursor.

While the touchpad does perform the same functions as a mouse, it does so in a way quite different to the manner in which mouse users are accustomed. Use of the touchpad requires repetitive finger movement, leading to a somewhat cumbersome manner of use. In addition, should the user's finger be slightly moist, the performance of the thermal sensors in the pad is degraded. The touchpad is normally located in the center front portion of the keyboard. While this placement accommodates both right- and left-handed users, this compromise position is not particularly comfortable for either to use, since most mouse users, be they right- or left-handed, are accustomed to having the mouse located on a particular side of the keyboard.

The result is that users of notebook computers, who find such pads inefficient, resort to the use of an external mouse even though its volume is cumbersome with relation to the size of the computer. The use of an external mouse somewhat defeats the purpose of the drive towards smaller size and requires the user to carry a separate piece of equipment in additions to the notebook computer. One attempt to alleviate this problem was the development of the mini-mouse. The mini-mouse is smaller than a normal mouse, but is still voluminous compared to the size of the laptop or notebook computer. Further, this external mouse must still be packed separately when traveling. Recently, a flat wireless mouse, the MoGo™, which is storable in the PC Card slot of a notebook computer has been introduced. This is also a touchpad device, but not fully functional.

The use of an external mouse requires the presence of a flat surface near the computer on which to operate the mouse. However, often notebook computers are used on the user's lap or other location where no such useable flat surface may be available. The user must then be content using the cumbersome touchpad. Current mouse designs take on many forms. Some designs attempt to be more ergonomic, since it has been shown that repetitive use of a mouse, which requires grasping it, may lead to physical discomfort, carpal tunnel syndrome, or other repetitive motion injuries.

Thus what is desired is a computer pointing device that is relatively small with respect to a notebook computer.

SUMMARY OF THE INVENTION

The present invention is a pointing device that utilizes a sliding plate to direct the onscreen motion of the screen pointer while performing all the mouse's functions. Like a touchpad on current notebook computers, the new pointing device uses the motion of the user's finger but with a sliding plate as the input device, thereby allowing the user's finger to perform all the mouse's functions with easier and more familiar movements. In addition, variants of two embodiments allow its use as a PC desktop mouse that is also highly ergonomic. Use of the pointing device should reduce the repetitive motion difficulties that many users experience in repeatedly grasping a mouse, since this pointing device requires no grasping and in use the hand is practically flat which is a more normal position for the hand.

In one aspect of the present invention the pointing device for personal computers includes a thin elongate case for insertion in a PC Card slot and defining a cavity therein. A frame forms one surface of the case and defines an opening therethrough. A slidable plate is disposed within the cavity and is translatably supported in a plane parallel to the frame. A portion of the slidable plate is accessible through said frame opening. At least one motion sensor is mounted within the case and is coupled with the slidable plate for sensing movement of the plate and converting the sensed movements into electrical data signals. A communication interface transmits data signals between the motion sensor and the computer.

Another aspect of the present invention is an ergonomic pointing device for use with personal computers and includes a multi-segmented case wherein a first midsection defines a cavity therein and a second midsection is substantially coplanar and slidable with respect to the first midsection. Each of the first and second midsections have distal ends that are hingedly affixed thereto such that the distal ends are selectively rotatable between a first stored position and a second extended position forming support legs for the multi-segmented case. A removable frame forms one surface of the first midsection and defines an opening therethrough. A slidable plate is disposed within the cavity and has a portion thereof exposed through the frame opening. The slidable plate is translatably supported in a plane substantially parallel to the frame. At least one motion sensor is mounted within said case and is coupled with the slidable plate for sensing movement of the slidable plate. A communication interface transmits data signals between said motion sensor and the computer.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which:

FIG. 12 is a top plan view of an ergonomically designed free standing pointing device;

FIG. 13 is a side elevation view of the pointing device of FIG. 12.

Like reference numerals refer to like parts throughout the several views of the drawings.

DETAILED DESCRIPTION OF THE PREFERRED EMBODIMENT

Figure 1:
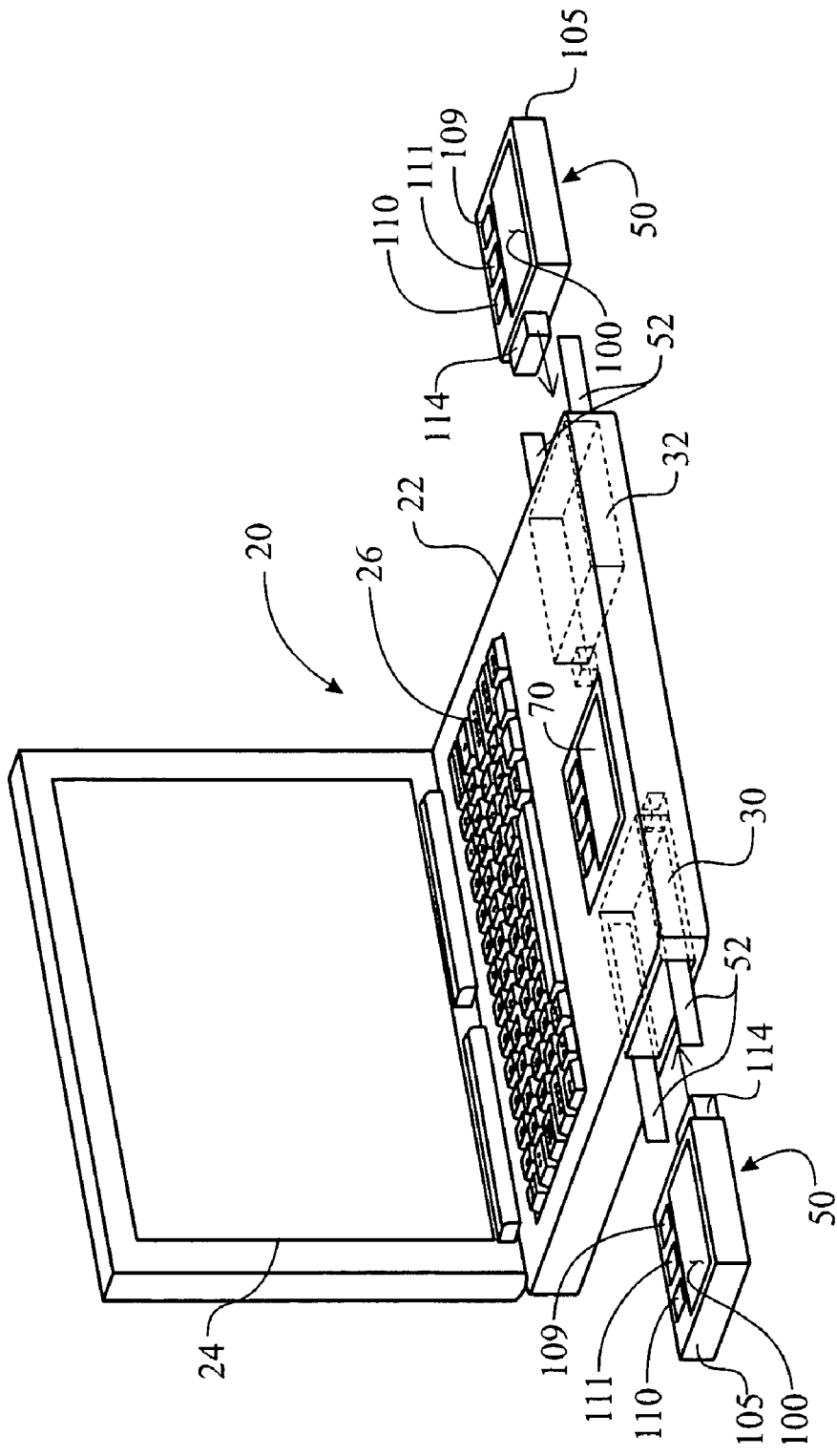
FIG. 1 is a perspective view of a notebook embodying the present invention, wherein a pointing device in insertable in either a left or right PC Card slot.
Figure 2:
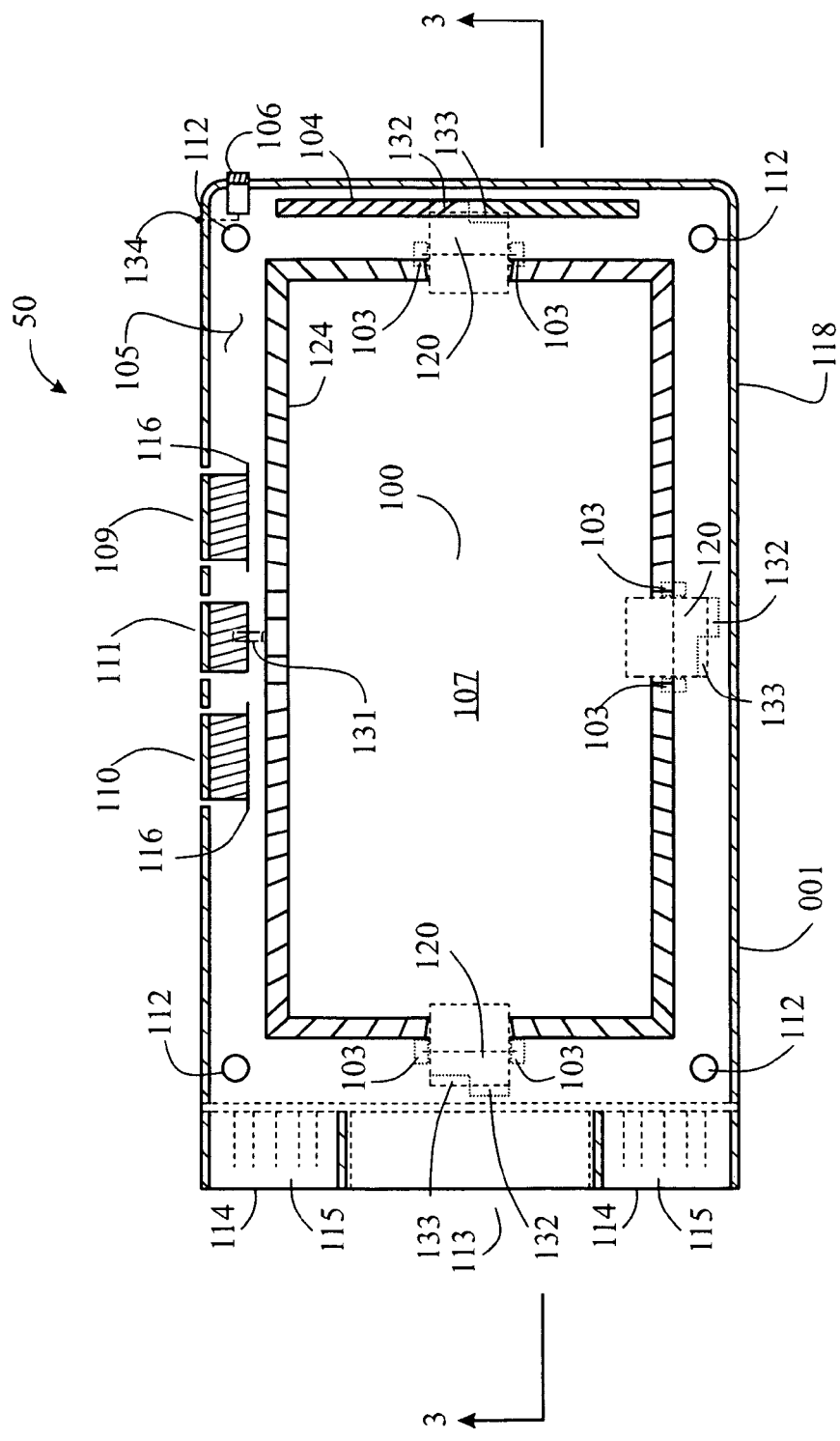
FIG. 2 is a plan view of the pointing device.

For purposes of description herein, the terms "upper", "lower", "left", "rear", "right", "front", "vertical", "horizontal", and derivatives thereof shall relate to the invention as oriented in FIGS. 1 and 2. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a computer-pointing device 50, which is one of the preferred embodiments of the present invention and illustrates its various components. A notebook computer 20 comprises a typical design having a chassis 22 that includes a flat panel display screen 24, a keyboard 26, and various electronics (not shown) for processing data. Computer 20 also includes PC Card slots 30, 32 wherein slot 30 is positioned on a left side of chassis 22 and slot 32 is positioned on a right side of chassis 22. A low profile pointing device 50 according to the present invention, conforming to the form factor of an industry standard PC Card, can be received in either PC Card slot 30 or 32 for use in either a left-handed configuration (when received in slot 30) or a right-handed configuration (when received in slot 32).

Referring now to FIGS. 1-5, a preferred embodiment of the pointing device 50 includes a thin elongate case 136 substantially conforming to the form factor of a notebook computer PC Card and having substantially identical removable frames 105, each frame 105 defining a rectangular opening 124 therethrough. Within a cavity defined by case 118, a set of upper motion sensing rollers 120 are in vertical registration with a set of lower motion sensing rollers 122, and distributed around a periphery of openings 105. In the most preferred embodiment, one each of sensor rollers 120, 122 are associated with one side of the rectangle defined by opening 105. An electromechanical motor 123 can be incorporated within at least one of the sensor rollers 120, 122.

A sliding plate 100 is movably supported between rollers 120, 122 within the cavity such that sliding plate 100 is horizontally movable in any direction. Sliding plate 100 includes surfaces 107 for placement of a user's finger to initiate translation of plate 100. Surfaces 107 can be textured to increase the frictional force between the user's finger and plate 100 and between plate 100 and rollers 120, 122. Surfaces 107 can also have a non-stick, non-adherent coating. Rollers 120, 122 are similar in function to a current art computer mouse that incorporates a rolling ball and positioned in the same manner at 90 degrees relative to each other, thus providing for movement of the cursor on the screen, in all axes. Rollers 120, 122 are spring mounted by spring arms 102 biasing sensor rollers 120, 122 one in opposition to the other to assure constant contact with plate 100. Each sensor roller 120, 122 is mounted with a hinge 103 to permit sensor rollers to be folded away from plate 100 thereby allowing sliding plate 100 to be removed for cleaning. Further, each sensor roller 120, 122 in contact with the plate 100 is mounted on a small internal electro-mechanical motor controlled by computer 20. Other methods of moving rollers 120, 122 are contemplated, but the motor-controlled rollers are most preferred. In such a configuration plate 100 may also be remotely slid in its lateral plane by rollers 120, 122 driven by the internal electro-mechanical motors.

In lieu of roller sensors 120, 122, an optical sensing system may be incorporated wherein a movement of an optical pattern on surface 107 is optically sensed and transmitted to the operating software whereupon that movement is translated into a corresponding movement of the cursor on display 24. Other sensing systems are also contemplated for incorporation into device 50.

The dimensions of plate 100 are limited by the surface area of the card embodiments. Since pointing device 50 must fit into PC slot 30, 32 in notebook computer 20, the card's maximum dimensions are therefore currently 0.21 inch/5 mm thick, and 2.125 inches/54 mm wide. However, device 50 is preferably slightly longer than the length (2.875 inches/74 mm) of slots 30, 32, making device 50 protrude slightly from the case 22 of notebook 20. This protrusion permits pointing device 50 to have a slightly greater dimension in length than width, similar to the dimensional proportions of the computer display. The slightly longer length of pointing device 50 permits for the placement of a groove 104 in the top and bottom surfaces at the protruding end 128 of device 50. Groove 104 allows the device 50 to be gripped easily and pulled out manually from slots 30, 32. It is understood the dimensions provided are based upon the current standard format and that the PC slot can be of any reasonable dimensions for slots having equivalent functions."

As illustrated in FIG. 2, pointing device 50 further includes a plurality of function control switches 109-111 arrayed along one edge of device 50. Function control switches 109-111 perform functions substantially identical to those found on prior art pointing devices. Switches 109, 110 function as right and left "click" buttons for interaction with the GUI implemented on computer 20. Switches 109, 110 are each mounted on a hinge 116. This is necessary so that switches 109, 110 may serve on both top and bottom of device 50 when it is used in a right- or left-handed position. Switch 111 functions as a "scroll" switch and is preferably located between "click" switches 109 and 110. Switch 111 is spring-actuated and slides in a groove 131 so that it returns to its neutral position after use. Switches 109-111 are positioned such that they are equally accessible from either the top or bottom surfaces of device 50. Other control buttons may also be located on the surface.

Figure 3:
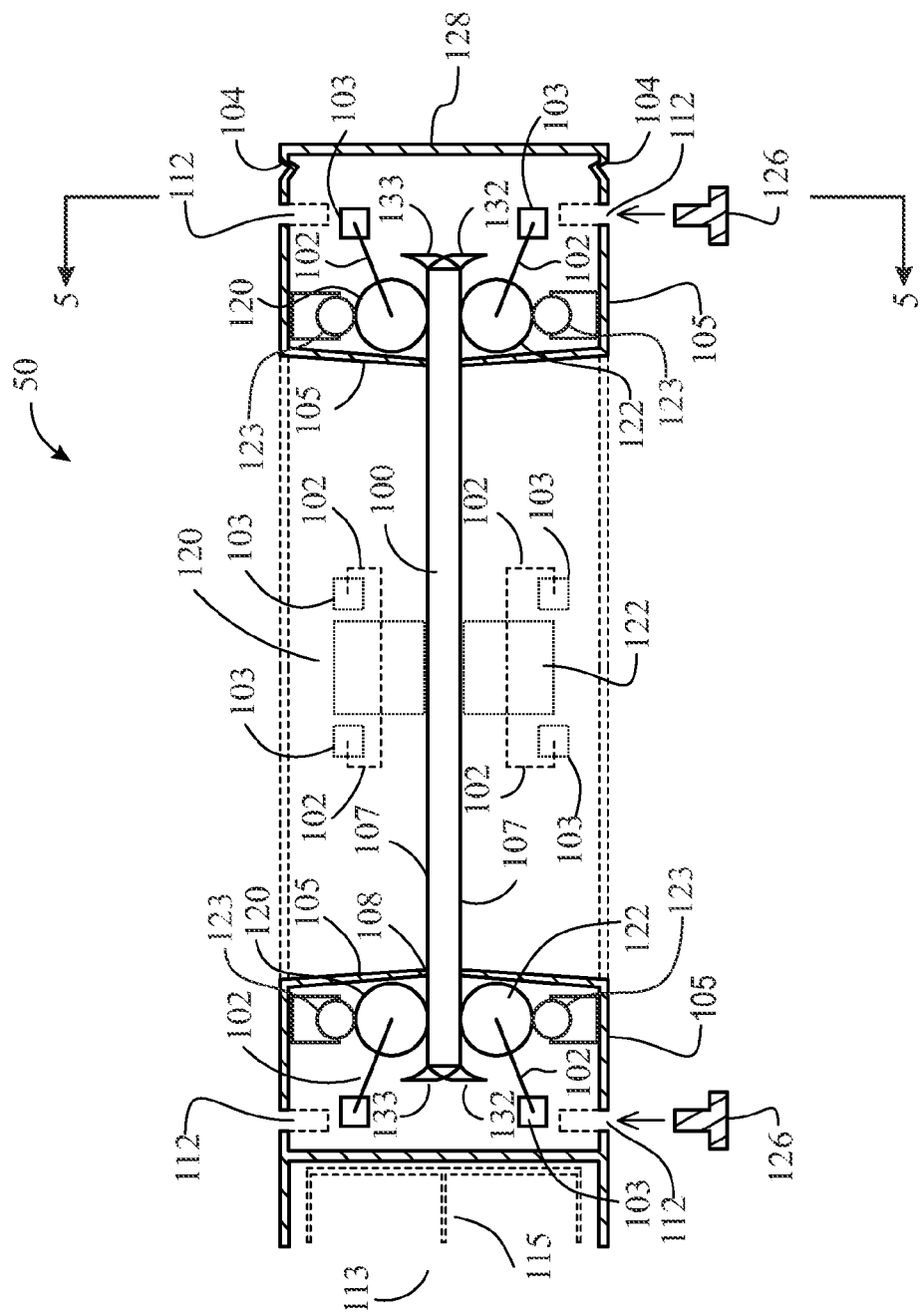
FIG. 3 is a cross-sectional front elevation view of the pointing device shown in FIG. 2 and taken along the line 3-3, FIG. 2.
Figure 4:
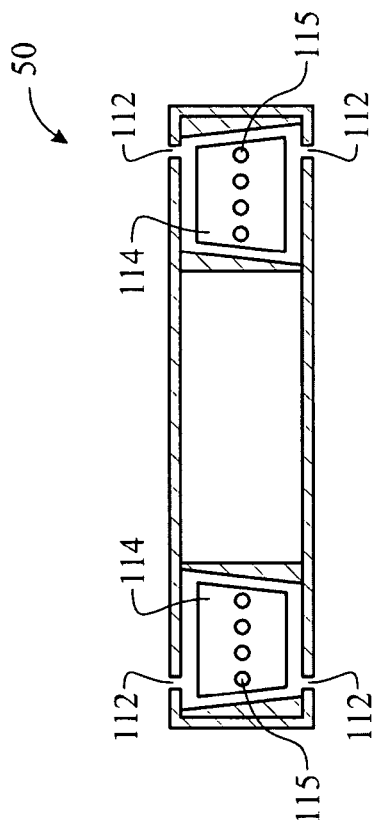
FIG. 4 is an end elevation view of the pointing device illustrating the interface electrical connector configuration.
Figure 5:
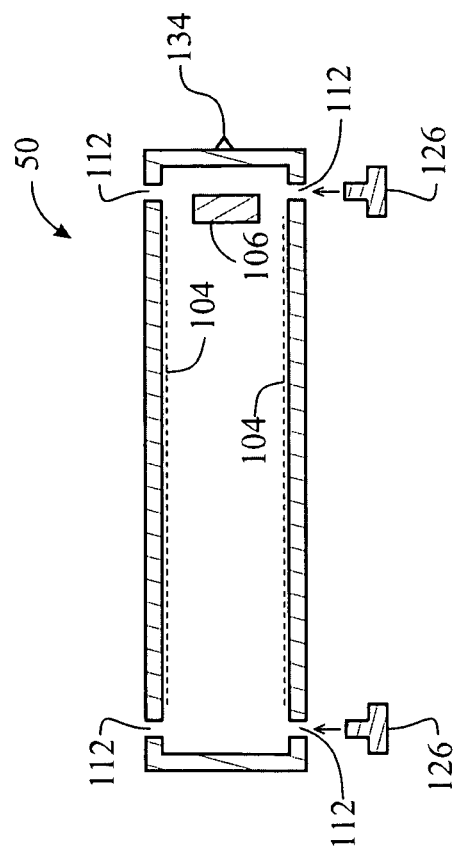
FIG. 5 is a cross-sectional end elevation view of the pointing device shown in FIG. 3 and taken along the line 5-5, FIG. 3.

Referring to FIGS. 2-4, inserted end 113 of device 50 includes at each side thereof a female mini-USB jack 114 (or other suitable interface) that forms part of a communication interface between device 50 and computer 20. Jacks 114 are oriented 180 degrees one from the other such that a 180 degree reorientation of device 50 will present an identical jack 114 configuration and its interface pins 115 are in the correct up/down position for engagement of a male mini-USB jack in slots 30,32.

Removable frames 105 define holes 112 near each of the four corners thereof, into which are received footpads 126. In general, for a majority of the embodiments, four foot pads 126 are placed into holes 112 in order to transform the PC Card slot pointing device 50 into a variant usable as desktop pointing device.

In use, device 50 is inserted into either PC slot 30, 32, and is particularly useful with notebook 20 when a flat space normally required for an external mouse is not available. When inserted in slot 32, device 50 functions as a right-handed pointing device. In this orientation switch 110 functions as the "left-click button" found on prior art devices and switch 109 functions as the "right-click button" found on prior art devices. However, device 50 can be inverted for insertion into PC slot 30 on the left side of notebook computer 20 whereupon it functions as a left-handed device. In this orientation switch 109 functions as the "left-click button" found on prior art devices and switch 110 functions as the "right-click button" found on prior art devices. In both orientations, switch 111 retains its "scroll" function. The operating software installed in notebook computer 20 driving device 50 recognizes the slot 30, 32 in which device 50 is engaged and automatically configures switches 109, 110 to the correct "handedness." Further, the operating software automatically configures the electrical inputs from rollers 120, 122 to correlate a directional movement of plate 100 with a corresponding directional movement of the pointer on display 24.

Pointing device 50 is usable with notebook computers having an integral touch pad for those users who desire an alternative pointing device but do not wish to use an external mouse. Future notebook computers can incorporate pointing device 50 as a primary pointing device in lieu of a touch pad. When fully inserted in slot 32, device 50 is locked in place by a spring-actuated lock 134. When fully seated in slot 32, device 50 can be slightly ejected either by pushing inwards upon the exposed end 128 or by pushing a release button 106. In either case, the spring-actuated lock 134 in the rear of slot 32 is released, thereby pushing device 50 slightly out of slot 32. Grasping device 50 by groove 104, device 50 can then be manually pulled outwards to its functioning position, at which point it locks into that position. In the event of a failure of the spring-loaded lock or ejection mechanism 134 or ejection button 106, grasping device 50 by groove 104 permits device 50 to be manually pulled out of PC slot 32. As the device 50 is pulled into its functioning position, the internal interfaced USB-jack 114 slides along a spring-loaded track 52, allowing the interface to remain engaged when device 50 is in its operating position, and further facilitates retraction of the interface when device 50 is pushed back into slot 32 for storage.

Once device 50 is in its operating position, the user places a finger on surface 107 of plate 100 and translates plate 100 within its operational plane. The planar translations of plate 100 cause sensor rollers 120, 122 to rotate about their respective axes. The rotations of sensor rollers 120, 122 send proportional electrical signals to computer 22 which in turn are interpreted and translated into corresponding cursor movements on display 24. For ease of use of plate 100, it is preferable that the proportionality be such that a movement of plate 100 from its neutral position to any edge will accomplish the movement of the screen cursor to the edge of computer display 24 in that direction. It is also possible to program the operating software to movements of plate 100 where its movement is not very proportional to the movement of the display cursor. In this case plate 100, when translated to a maximum lateral position such that the user's finger touches the removable frame 105, the screen cursor would not move to the edge of the computer screen; rather, the screen cursor would continue movement in the direction of the plate's 100 previous direction, until the user removed the finger pressure on plate 100.

The dimensions of plate 100 being necessarily smaller than case 118, restrict the movement of plate 100 to an area less than the size of the device 50. This limitation is similar to the functioning of the current-art touch pad of portable computers, and different from an external mouse, which can be moved over any flat surface for any theoretical distance. However, it is not necessary for plate 100 to move over significant distances in order to move the cursor over the entire screen. In current pointing devices movements of the device, and thus the cursor on the screen, are typically proportional; i.e., small movements of the mouse generate larger movements of the cursor. Since users of prior art pointing devices are accustomed to the proportionally greater movement of the cursor compared to input movements, no significant problem is anticipated for a user to become accustomed to the use of sliding plate 100.

A user designates completion of a desired cursor function by relaxing finger pressure on plate 100 and subsequently depressing any key on the computer's keyboard or after a user-programmed predetermined time interval. Upon completion of such movements, plate 100 (and therefore the screen cursor) is either left in its last position or is automatically repositioned to its "neutral" position in the center of the frame by computer-controlled rotations of the rollers 120, 122 by commanding the electro-mechanical motors associated with each roller 120, 122. If thus programmed, the automatic repositioning function allows for immediate resetting to the neutral position, and thus reuse of plate 100, reducing the necessity for repetitive finger movement to position the cursor, as well as the most rapid average positioning of the cursor on display 24.

Plate 100 may be depressed by the user's finger on its right or left side. Such a depression is sensed by the movement of springs 102 in hinge structure 103 of rollers 120, 122. This depression is an alternate to the use of the right 109 or left 110 buttons, analogous to those on a computer mouse. Such deflection of springs 102 associated with each of sensor rollers 120, 122 is sensed when plate 100 is depressed greater than the finger pressure normally exerted to move the plate, and which pressure may be user defined. As in prior art pointer devices with right and left "click" buttons, when the display cursor is moved to a part of the display where a click function is enabled, depressing the left side of plate 100 once or twice can be programmed to be the equivalent of a corresponding one or two clicks on left button switch 110. A corresponding once or twice depression of the right side of plate 100 can be programmed to be the equivalent of a corresponding one or two click on right button switch 109.

Manipulation of plate 100 can also perform commonly used combination features such as "drag and drop," and "cut, copy and paste" functions. These functions are analogous to those in prior art pointing devices; i.e., maintaining the left button 110 depressed to move an object, "cut", "paste" "copy" in order to effect that function on text in a document. For example, to drag an object with sliding plate 100, the cursor is moved by plate 100 to an object to be "dragged" whereupon the left side of plate 100 is depressed. While maintaining downward pressure on the sliding plate, the user then moves the cursor by again appropriately translating plate 100 to the onscreen position where the object is to be "dropped." Thereupon the pressure on the left side of plate 100 is released, and the object is dropped. To drag text, the user depresses the left side of sliding plate 100 and, while maintaining that pressure, moving plate 100, and thus the screen cursor, through the text to be "dragged." Once the desired text has been selected, the pressure on plate 100 is released thereby highlighting the selected text. The user again depresses the left side of sliding plate 100 and, while maintaining such pressure, translates plate 100 until the cursor is placed where the text is to be "dropped". Thereupon, the pressure on the plate is released, which "drops" the text at that point. The cutting, copying, and pasting functions are accomplished in a similar manner. These functions can be further customized through settings in the application software driving device 50. In all the above operations, depressing the right 109 or left button 110 will have the same effect, since depressing and releasing plate 100 mimics the button operation of prior art pointing devices. Many users may find such functionality of sliding plate 100, enabling these functions directly with the user's finger remaining on the plate, more convenient and advantageous than repeatedly moving a finger between buttons 109-110 and plate 100 to effect another operation.

When the screen cursor is positioned at a location on the screen where a computer-recognized scroll function is enabled, sliding button 111 in its guide slot or track 131 in either an up or down movement will perform the scroll function. Sliding button 111 towards either extremity will effect a "fast" scroll. Upon release of the button, the spring (not shown) will reposition button 111 to its "neutral" position in the center of the slide. Such a "fast scroll" functionality is a significant improvement over a prior art "scroll wheel." Scroll wheels require repetitive movement of the wheel; however, with the fast scroll function, no repetitive movement is required.

Surface 107 of plate 100 is slightly lower than the top surface of device 50, and is held in place by removable frame 105, the surface of which is an outer surface of device 50. Frame 105, when removed, allows access for cleaning. To remove plate 100, top rollers 120 are positioned upward on their respective hinges 103 so that plate 100 may be removed and cleaned. Removal of plate 100 gives access to the lower rollers 122 for cleaning. Periodic access for cleaning is necessary since dirt and dust may enter the unit through the small gap 108 between the surface 107 of plate 100 and plate frame 105.

Plate 100 at the central area of each peripheral edge includes a protrusion 133 arcing upwards towards roller 120 and a protrusion 132 and arcing downwards towards roller 122. Protrusions 132, 133 provide stops for the centering of plate 100 to the neutral position after cleaning. When hinge structures 103 signal that the four upper rollers 120 have been placed in an upward position allowing for removal of plate 100 for cleaning, computer 20 is placed in a "cleaning" mode. When plate 100 is replaced, computer 20 must recalculate and reposition plate 100 to its "neutral" position. This function is performed by commands from the application software that instruct the motorized rollers 120, 122 to slide plate 100 in a horizontal direction until rollers 120, 122 sense the contact of protrusions 132, 133 therewith and then repeating the movement in the vertical direction. Computer 20 thus can calculate the neutral position of plate 100 and command the motorized rollers 120, 122 to so position plate 100.

Device 50 is powered by the mini-USB interface and may be completely pulled out of slot 32 pulling a cable interface (not shown) with it. Additionally, device may be fully disengaged from slot 32 other than its USB interface for use in a manner similar to a desktop mouse. During such an extraction, the cable is reeled out and remains connected to device 50. In the event device 50 is disengaged from the cable for any reason, the male interface slides back to a position near the edge of the laptop, permitting the cable to be reengaged at will.

Figure 6:
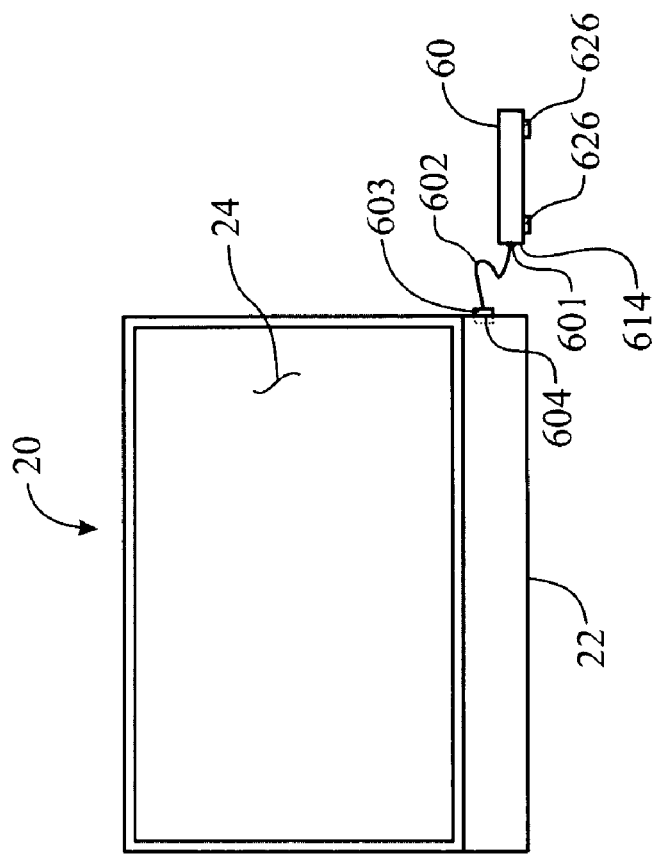
FIG. 6 is a front elevation view of a computer having a pointing device connected thereto with an electrical cable.

Another pointing device 60, is shown in FIG. 6 wherein device 60 is connected to computer 20 and utilized as a desktop pointing device. Device 60 incorporates the pointing device 50 in its PC Card configuration and further includes the addition of footpads 626 to the holes 112 of device 50 (FIG. 2). Footpads 626 are removable, since device 60 cannot be reinserted into the PC slot 32 (FIG. 1) with footpads 626 in place. Pointing device 60 is connected to computer 20 with a modified mini-USB cable 602. One end of cable 602 is terminated with a male mini-USB jack 601 to connect to the female mini-USB port 614 of device 60 and the other end of cable 602 is terminated with a male USB jack 603 to connect to a standard USB port 604 on a side of the computer. Device 60 can also include a wireless capability to wirelessly communicate with computer 20. Device 60 is illustrated herein as a right-handed pointing device, but can also be utilized as a left-handed device by connecting to a USB port on the left side of computer 20 and inverting pointing device 60 with foot pads 626 inserted into the holes 112 on the opposite side thereof. Computer 20 recognizes whether device 60 is connected to its right side or its left side and automatically configures device 60 accordingly in the same manner as discussed above with respect to the embodiment of pointing device 50.

Figure 7:
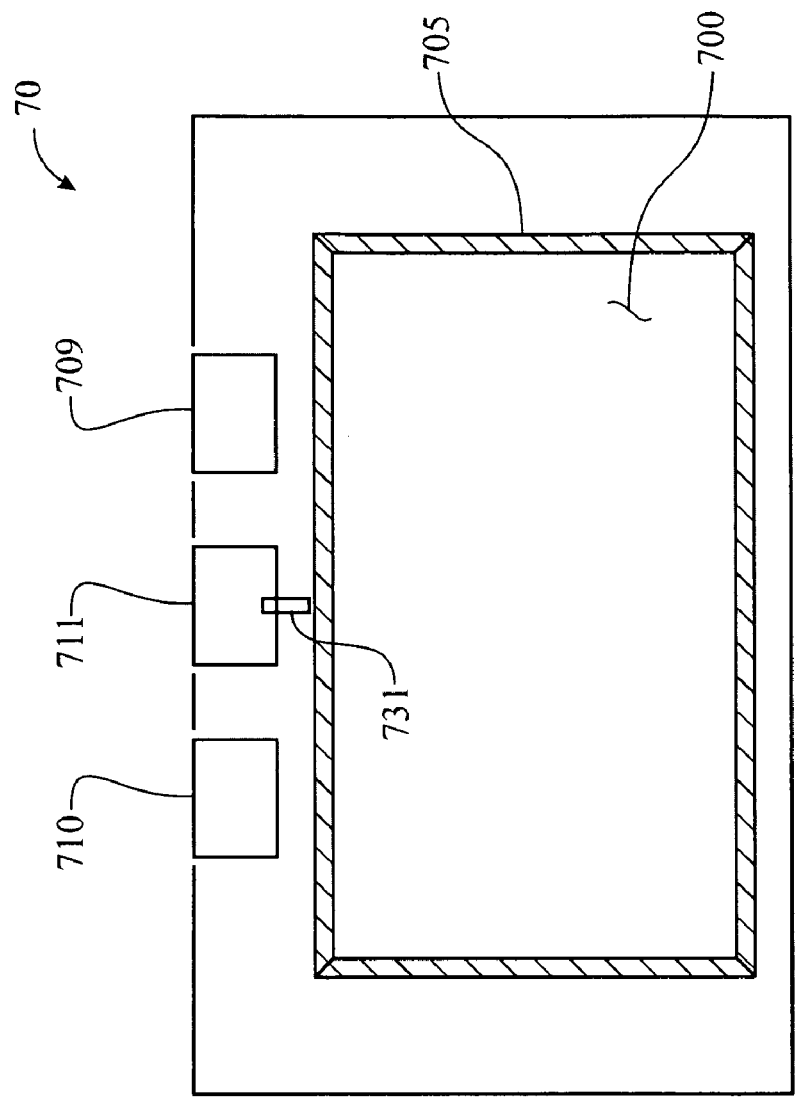
FIG. 7 is a plan view of an alternate embodiment pointing device for integral embedment in the chassis of a notebook computer.

Referring now to FIGS. 1 and 7, an alternate embodiment pointing device 70 is illustrated and intended to be a replacement for prior art touch pads commonly found as standard in many notebook computers. Device 70 incorporates the same plate 100 and electro-mechanical rollers 120, 122 found in device 50 and functions in the same manner. Pointing device 70 is integrally incorporated into chassis 22 of notebook computer 20. Since device 70 is intended for integral incorporation and notebook manufacturers may find it desirable to maintain a central location for a pointing device, it is positioned centrally between the left and right sides of chassis 22, and therefore does not require the invertibility, as does device 50. Right and left button switches 709, 710 are depressible in lieu of being on hinges as in device 50, while scroll button 711 is identical to button 111 and slides in a track 731. Device 70 includes a removable frame 605 for access to remove plate 700 for cleaning as described above.

Figure 8:
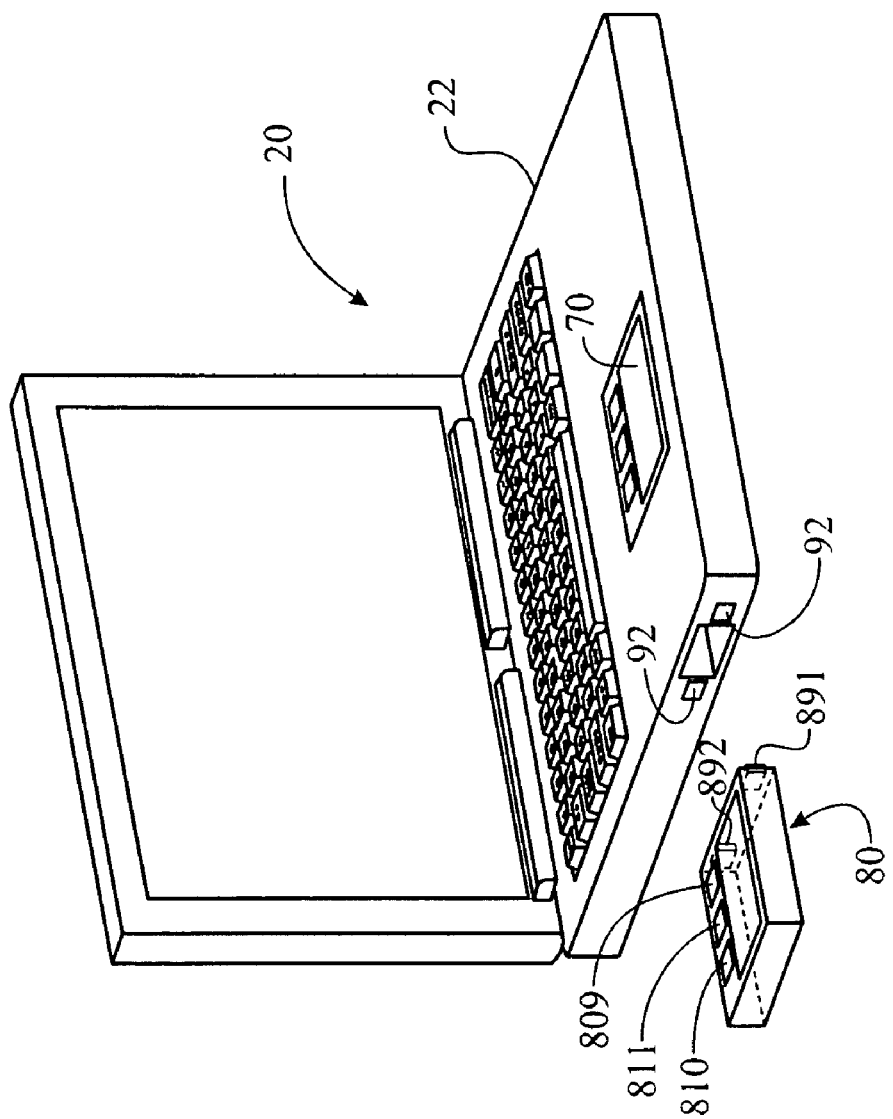
FIG. 8 is a front perspective exploded view of a computer with a pointing device for direct attachment to electrical interface connectors.
Figure 9:
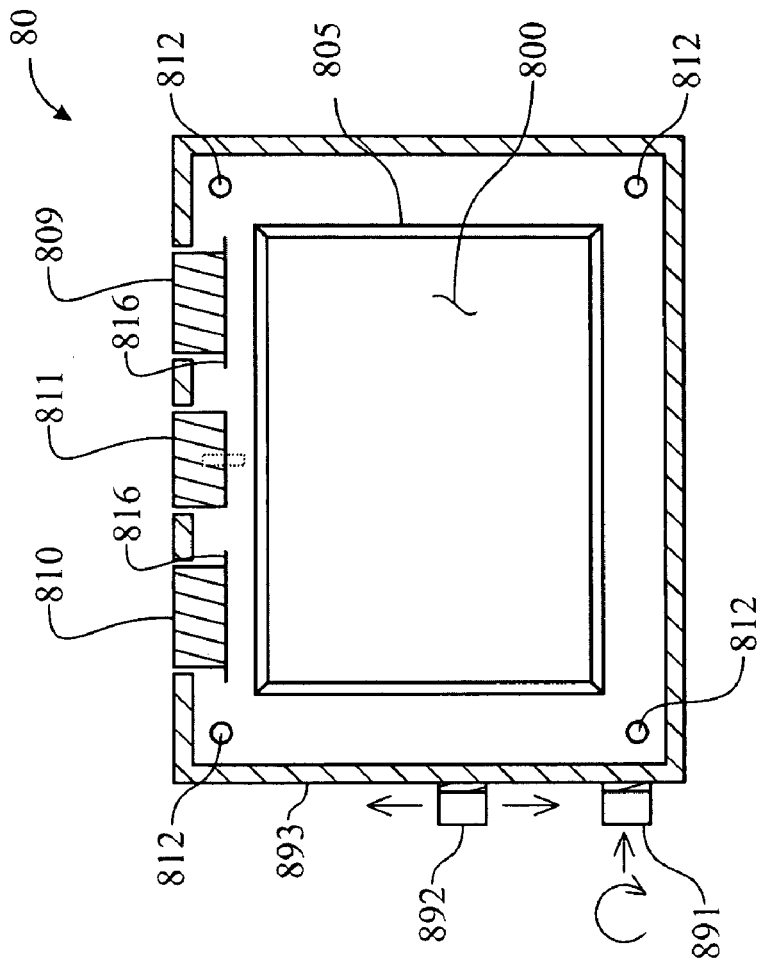
FIG. 9 is a plan view of the pointing device of FIG. 8.

Yet another embodiment is shown as pointing device 80 in FIGS. 8-9. Device 80 has a larger upper surface area and is thicker than preceding embodiments, since pointing device 80 is not intended to be received in a PC card slot. Device 80 uses a standard USB interface jack 92 on computer 20 and may be interfaced with computer 20 on either left or right side of computer 20. The increased size of pointing device 80 enables a larger area sliding plate 800, wherein the plate 100 has a larger movement area. Thus, the ratio of plate/cursor movement is preferably that of a standard prior art pointing device in current use. The larger size may provide more ease of use for some users.

Pointing device 80 has the same general surface appearance, controls, internal construction and software functions as pointing device 50 previously described with respect to FIGS. 1-2.

Pointing device 80 includes a male Type A USB plug 891 at an interface end 813 for electrical interface with computer 20. USB plug 891 fits into Type A USB receptacle 92 on either side of the computer 20. The USB interface connects pointing device 80 to the computer 20 for electrical communication and also supplies power to device 80. Optionally, the interface may also be wireless. Since device 80 is not sized to fit into any computer slot, device 80 is carried separately from the computer 20. Since standard USB Type A plugs and receptacles are orientationally keyed, the male USB plug 891 of device 80 can be rotated 180 degrees, in order for the device 80 to be used in either a right-handed or left-handed configuration. FIG. 8 illustrates device 80 keyed for use as a left-handed pointing device. However by rotating USB plug 891 180 degrees, device 80 can be interfaced to the right side of computer 80.

When interfaced with computer 20, device 80 must be stabilized on the side of computer 20 in a more stable fashion than the single USB connection provides. In order to perform this stabilization function, a dummy stabilization plug 892 is utilized. Dummy stabilization plug 892 has no electrical connectivity between computer 20 and device 80 and fits into a standard USB Type A port 92 on a side of computer 20. Since the spacing of USB ports 92 differ between models of notebook computers, the relative positions of the dummy stabilizer plug 892 and USB plug 891 should preferably be variable in separation. Device 80 facilitates this variability by mounting dummy stabilizer plug 892 in a rail 893 (FIG. 8) on the insertion end 813 of device 80.

In use, dummy stabilizer plug is positioned along rail 893 to correspond to the placement of USB jacks on the desired side of computer 20. Device is then interfaced with computer 20 by inserting both active USB plug 891 and dummy stabilizer plug 892 in the respective USB ports 92 whereby dummy stabilizer plug 892 provides physical support for the body of device 80.

Figure 10:
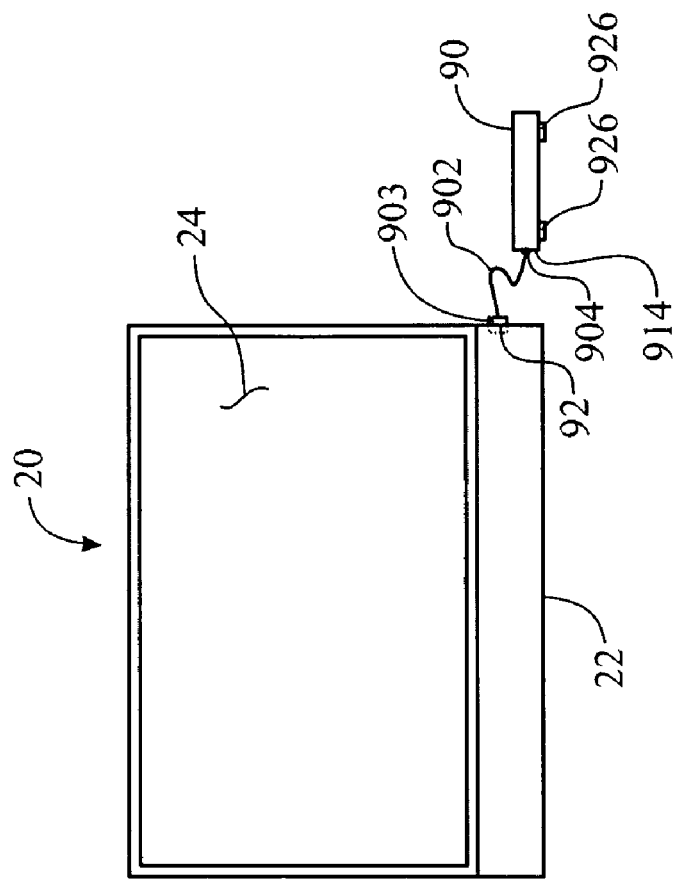
FIG. 10 is a front elevation view of a computer having an alternate embodiment pointing device connected thereto with an electrical cable.
Figure 11:
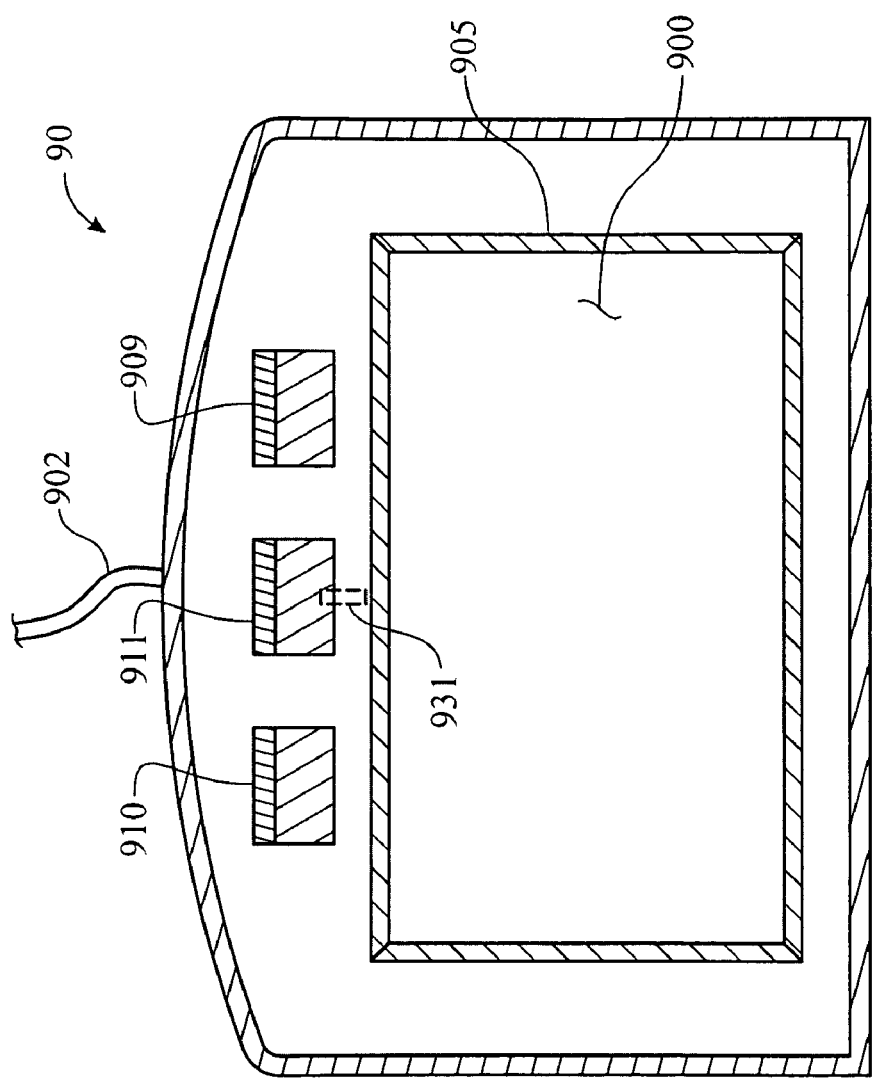
FIG. 11 is a top plan view of an alternate embodiment pointing device for use as standalone pointing device.

FIGS. 10-11 illustrate a pointing device 90 configured for use as a desktop pointing device to replace prior art desktop pointing devices that are in popular use today. Device 90 may be used in either a right-hand or left-hand configuration and includes four foot pads 926 inserted into holes corresponding to holes 112 in pointing device 50 (FIG. 2) so that device 90 remains securely positioned on the flat surface as the user desires.

Pointing device 90 includes a larger-sized plate 905 for ease of use and has the same surface appearance, controls, internal construction, and software functions as previous embodiments. Pointing device 90 is connected to the computer 20 and powered by a standard USB cable 902. Cable 902 extends from device 90 and terminates with a standard USB plug 903 that is inserted into a USB port 92 on either side of the computer 20. The USB port recognizes the interface of device 90, and automatically configures it either for a right or left-hand mouse as a function of the side of the computer USB plug 903 is inserted. The handedness of device 90 can also be independently set as an option in the application software.

Alternatively, cable 902 can include a USB connector interface at device 90 wherein cable 902 includes either a standard or mini USB connector 904 at the device 90 interface end that interfaces with a like USB connector 914 on device 90.

FIGS. 12-13 illustrate an ergonomic embodiment 1200 of a pointing device according to the present invention. Pointing device 1200 includes a sliding plate 1201 and has the same surface appearance, controls, internal construction, and software functions as device 90 (FIG. 11). Device 1200 incorporates a more ergonomic design than the pointing device 90 described above.

Device 1200 includes a top section 1202 and a bottom section 1203 that forms leg supporting midsections 1206, 1207 above the surface on which device 1200 rests. Top and bottom sections 1202, 1203 are hinged relative to mid-sections 1206, 1207 enabling device 1200 to be folded into a compact form factor. Mid-section 1206 forms a palm rest for the user on which the user may rest the palm of the hand operating device 1200. Mid-section slides on rail 1205 mounted under mid-section 1207 thereby enabling bottom mid-section 1206 to be shortened or lengthened to better fit the size of the user's hand when in use. When unfolded, the ergonomic shape allows the user's wrist to rest thereon in a comfortable position.

Pointing device 1200 is connected to a computer and powered by a standard USB cable 1220 that terminates in a male USB plug 1222. USB plug 1222 may be inserted into a USB port on either side of the portable computer. The USB port recognizes the interface of device 1200 and automatically configures for either right- or left-handed operation.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A low profile pointing device for personal computers, said pointing device comprising:
   a thin elongate case defining a cavity therein;
   a frame forming one surface of said case, said frame further defining an opening therethrough;
   a slidable plate disposed within said cavity, said slidable plate translatably supported in a plane substantially parallel to said frame and wherein a portion of said slidable plate is accessible through said frame opening;

at least one motion sensor within said case, said motion sensor coupled with said slidable plate for sensing movement of said plate and converting said sensed movements into electrical data signals; and a communication interface for transmission of data signals between said motion sensor and the computer, wherein said motion sensors include a plurality of sensor rollers in at least two non-parallel orientations, said rollers in contact with a surface of said sliding plate and responsive to translative motion of said plate, and wherein said plurality of sensor rollers include a first set of rollers contacting a first surface of said plate and a second set of rollers contacting a second opposing surface of said plate.

2. The pointing device according to claim 1 wherein said case has a form factor for insertion into a PC Card receptacle in the computer and further wherein said communication interface is compatible with a communication interface associated with the PC Card receptacle.

3. The pointing device according to claim 2 wherein said case is selectively partially ejectable from the PC Card receptacle for user access to a portion of said slidable plate exposed through said frame opening while maintaining communication interface with the computer.

4. The pointing device according to claim 1 further including a plurality of button switches connected to said communication interface and arrayed on a periphery of said case for access and use by a user to perform pre-defined computer command functions.

5. The pointing device according to claim 4 further including a second frame forming a second surface of said case and opposite from a first frame, said second frame defining a second opening for access to said slidable plate and wherein:

said case form factor permits insertion in a first PC Card slot on a first side of the computer and further permits inverted insertion in a second PC Card slot on a second side of the computer; and said button switches are reconfigurable to reassign specific functions associated with each said button switch.

6. The pointing device according to claim 1 wherein said motion sensor is an optical sensor optically responsive to translative movement of said sliding plate.

7. The pointing device according to claim 1 wherein each sensor roller of said first set is in registration with a corresponding sensor roller of said second set wherein said sliding plate is supportingly disposed between said first roller set and said second roller set.

8. The pointing device according to claim 7 wherein each said sensor roller is supported in said case by a spring support.

9. The pointing device according to claim 8 wherein spring supports communicate electrical signals responsive to symmetric and asymmetric depressions of said sliding plate in a direction normal to said translation plane of said sliding plate, and further wherein said communication interface is responsive to said electrical signals.

10. The pointing device according to claim 1 wherein said sliding plate includes at least one raised stop at each edge of said sliding plate, said stop positionally corresponding to an associated sensor roller for limiting translative movement of said sliding plate with respect to said sensor roller.

11. The pointing device according to claim 1 wherein at least one said sensor roller includes an electromechanical motor associated therewith, said electromechanical motor responsive to computer commands for selectively repositioning said sliding plate with respect to said roller sensors.

12. The pointing device according to claim 1 wherein said case is adapted to attach to an exterior side of a portion of the computer.

13. The pointing device according to claim 12 wherein said case includes a communicative Universal Serial Bus (USB) plug extending from a first side of said case, said USB plug comprising a part of said communication interface.

14. The pointing device according to claim 13 wherein said case includes a dummy USB plug extending from said first side and laterally disposed from said communicative USB plug, said dummy plug laterally translatable in a rail such that said pointing device is attachable to the computer by inserting said communicative plug in a first USB port of the computer and said dummy plug in a second USB port of the computer laterally disposed from the first USB port.

15. The pointing device according to claim 14 further including a second frame forming a second surface of said case and opposite from said first frame, said second frame defining a second opening for access to said slidable plate and wherein:

said communicative plug is rotatable by 180 degrees with respect to said case to permit inverted attachment to a second side of the computer; and said button switches are reconfigurable to reassign specific functions associated with each said button switch.

16. The pointing device according to claim 1, said pointing device further comprising:

a multi-segmented case wherein a first midsection defines a cavity therein and wherein a second midsection is substantially coplanar and slidable with respect to said first midsection, each of said first and second midsections having distal ends hingedly affixed thereto wherein said distal ends are selectively rotatable between a first stored position and a second extended position forming support legs for said multi-segmented case;

a removable frame forming one surface of said first midsection, said frame further defining an opening therethrough;

a slidable plate disposed within said cavity and having a portion thereof exposed through said opening, said slidable plate translatably supported in a plane substantially parallel to said frame;

at least one motion sensor within said case, said motion sensor coupled with said slidable plate for sensing movement of said slidable plate; and a communication interface for transmission of data signals between said motion sensor and the computer.

17. A low profile pointing device for personal computers, said pointing device comprising:

a thin elongate case defining a cavity therein;

a frame forming one surface of said case, said frame further defining an opening therethrough;

a slidable plate disposed within said cavity, said slidable plate translatably supported in a plane substantially parallel to said frame and wherein a portion of said slidable plate is accessible through said frame opening;

at least one motion sensor within said case, said motion sensor coupled with said slidable plate for sensing movement of said plate and converting said sensed movements into electrical data signals; and a communication interface for transmission of data signals between said motion sensor and the computer, wherein said motion sensors include a plurality of sensor rollers in at least two non-parallel orientations, said rollers in contact with a surface of said sliding plate and responsive to translative motion of said plate, and wherein said frame is removable from said case and further wherein said sensor rollers are movable to permit removal of said sliding plate.

18. The pointing device according to claim 17 wherein said sliding plate includes at least one raised stop at each edge of said sliding plate, said stop positionally corresponding to an associated sensor roller for limiting translative movement of said sliding plate with respect to said sensor roller.

19. The pointing device according to claim 17 wherein each said sensor roller includes an electromechanical motor associated therewith, said electromechanical motor responsive to computer commands for selectively repositioning said sliding plate with respect to said roller sensors.

20. The pointing device according to claim 17 wherein said case is adapted to attach to an exterior side of a portion of the computer.

21. The pointing device according to claim 17 wherein said case includes a communicative Universal Serial Bus (USB) plug extending from a first side of said case, said USB plug comprising a part of said communication interface.

22. A low profile pointing device for personal computers, said pointing device comprising:
a thin elongate case defining a cavity therein;
a frame forming one surface of said case, said frame further defining an opening therethrough;
a slidable plate disposed within said cavity, said slidable plate translatably supported in a plane substantially parallel to said frame and wherein a portion of said slidable plate is accessible through said frame opening;
at least one motion sensor within said case, said motion sensor coupled with said slidable plate for sensing movement of said plate and converting said sensed movements into electrical data signals; and
a communication interface for transmission of data signals between said motion sensor and the computer,
a communicative Universal Serial Bus (USB) plug extending from a first side of said case, said USB plug comprising a part of said communication interface;
wherein said case is adapted to attach to an exterior side of a portion of the computer;
a dummy USB plug extending from said first side and laterally disposed from said communicative USB plug, said dummy plug laterally translatable in a rail such that said pointing device is attachable to the computer by inserting said communicative plug in a first USB port of the computer and said dummy plug in a second USB port of the computer laterally disposed from the first USB port.

23. The pointing device according to claim 22 further including a second frame forming a second surface of said case and opposite from said first frame, said second frame defining a second opening for access to said slidable plate and wherein:
said communicative plug is rotatable by 180 degrees with respect to said case to permit inverted attachment to a second side of the computer; and
said button switches are reconfigurable to reassign specific functions associated with each said button switch.

24. A low profile pointing device for personal computers, said pointing device comprising:
a thin elongate case defining a cavity therein;
a frame forming one surface of said case, said frame further defining an opening therethrough;
a slidable plate disposed within said cavity, said slidable plate translatably supported in a plane substantially parallel to said frame and wherein a portion of said slidable plate is accessible through said frame opening;
at least one motion sensor within said case, said motion sensor coupled with said slidable plate for sensing movement of said plate and converting said sensed movements into electrical data signals; and
a communication interface for transmission of data signals between said motion sensor and the computer,
a second frame forming a second surface of said case and opposite from said a first frame, said second frame defining a second opening for access to said slidable plate and wherein:
said case form factor permits insertion in a first PC Card slot on a first side of the computer and further permits inverted insertion in a second PC Card slot on a second side of the computer; and
said button switches are reconfigurable to reassign specific functions associated with each said button switch, and
wherein said case has a form factor for insertion into a PC Card receptacle in the computer and further wherein said communication interface is compatible with a communication interface associated with the PC Card receptacle.

25. The pointing device according to claim 24 further including a plurality of button switches connected to said communication interface and arrayed on a periphery of said case for access and use by a user to perform pre-defined computer command functions.

* * * * *